United States Patent
Jamshidi et al.

(10) Patent No.: US 9,591,548 B1
(45) Date of Patent: Mar. 7, 2017

(54) METHOD AND SYSTEM FOR ADDRESSING AN ERROR CONDITION ASSOCIATED WITH A SERVICE THAT ENABLES USER EQUIPMENT DEVICES BEING SERVED BY A FIRST ACCESS NETWORK TO ENGAGE IN SIGNALING WITH A SECOND ACCESS NETWORK

(71) Applicant: Sprint Spectrum L.P., Overland Park, KS (US)

(72) Inventors: Talat Jamshidi, Leawood, KS (US); Wen Xue, Overland Park, KS (US); Jay D. Cole, Overland Park, KS (US); Rajat Kumar, Kansas City, MO (US); Siddharth S. Oroskar, Overland Park, KS (US); Nitesh Manchanda, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 255 days.

(21) Appl. No.: 14/488,181

(22) Filed: Sep. 16, 2014

(51) Int. Cl.
 H04W 36/30 (2009.01)
 H04W 36/14 (2009.01)
(52) U.S. Cl.
 CPC ........... *H04W 36/30* (2013.01); *H04W 36/14* (2013.01)
(58) Field of Classification Search
 CPC .................. H04W 36/14; H04W 36/0022
 See application file for complete search history.

(56) References Cited

U.S. PATENT DOCUMENTS

| 8,687,598 | B1 | 4/2014 | Prock | |
| 8,995,987 | B1* | 3/2015 | Singh | H04W 28/0221 455/423 |
| 9,148,817 | B1* | 9/2015 | Nguyen | H04L 47/2466 |
| 2010/0195616 | A1 | 8/2010 | Vikberg et al. | |
| 2010/0246530 | A1 | 9/2010 | Pehrsson et al. | |
| 2012/0002545 | A1* | 1/2012 | Watfa | H04W 48/06 370/235 |
| 2013/0286827 | A1* | 10/2013 | Zakrzewski | H04L 47/12 370/230 |
| 2014/0010180 | A1* | 1/2014 | Lee | H04W 48/02 370/329 |
| 2015/0201397 | A1* | 7/2015 | Jeong | H04W 68/005 455/458 |
| 2015/0304937 | A1* | 10/2015 | Kim | H04W 48/14 370/230 |

OTHER PUBLICATIONS

First Action Interview Pilot Program Pre-Interview Communication from U.S. Appl. No. 14/721,028, dated Sep. 14, 2016.

* cited by examiner

*Primary Examiner* — Robert M Morlan (57) ABSTRACT

In accordance with the disclosed methods and systems, while providing a service that enables user equipment devices (UEs) being served by a first network to engage in signaling with a second network via the first network, a controller or other network entity may detect an error condition associated with the service, such as a threshold-high level of signaling or an interface failure. In response to detecting the error condition, base stations in the first network may then direct one or more UEs being served by the first network to refrain from using the given service. As a result, the one or more UEs may refrain from using the given service and may instead use another approach to engage in signaling with the second network, which may enable the one or more UEs to circumvent the error condition until it gets remedied.

5 Claims, 6 Drawing Sheets

METHOD AND SYSTEM FOR ADDRESSING AN ERROR CONDITION ASSOCIATED WITH A SERVICE THAT ENABLES USER EQUIPMENT DEVICES BEING SERVED BY A FIRST ACCESS NETWORK TO ENGAGE IN SIGNALING WITH A SECOND ACCESS NETWORK

BACKGROUND

Unless otherwise indicated herein, the description provided in this section is not prior art to the claims and is not admitted to be prior art by inclusion in this section.

A typical cellular wireless network includes a number of base stations that radiate to define wireless coverage areas, such as cells and cell sectors, in which wireless communication devices (UEs) (also known as wireless communication devices (WCDs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies with each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

On each carrier frequency in a coverage area, the coverage area may also define a number of air interface channels for carrying information between the base station and the UEs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that UEs may detect as an indication of coverage and may measure to evaluate coverage strength. As another example, each coverage area may define an uplink control channel or other resource on which UEs may transmit control messages such as registration requests and access requests to the base station. And each coverage area may define a downlink control channel or other resource on which the base station may transmit control messages such as system information messages and page messages to UEs. Each coverage area may then define one or more traffic channels or other resources for carrying communication traffic such as voice data and other data between the base station and UEs.

When a UE first powers on or enters into coverage of the network, the UE may scan for and identify a strongest pilot or reference signal and may register with the network by transmitting a registration request or attach request to a base station providing that signal. This registration process may serve to notify the network of the UE's presence in a particular coverage area and to facilitate network authentication of the UE. Once registered, the UE may then operate in an idle mode in which the UE monitors a downlink control channel to receive overhead information and to check for any page messages. In the idle mode, the UE may have no assigned traffic channel resources on which to engage in bearer communication.

When the network has a communication (such as a voice call or other traffic) to provide to a UE that is registered with the network but is operating in the idle mode, the network may page the UE in an effort to then facilitate assigning traffic channel resources to the UE. In particular, the network may transmit on the downlink a page message addressed to the UE. Assuming the UE receives this page message, the UE may then transmit to the network a page response message on the uplink. And upon receipt of the page response message, the network may then assign traffic channel resources to the UE, for use to carry the communication, thus transitioning the UE to a connected or active mode in which the UE can engage in the communication.

Likewise, when an idle UE seeks to initiate a communication (such as to place a voice call or engage in other bearer communication), the UE may transmit on the uplink to the base station an origination or connection request, and the network may then assign traffic channel resources to the UE for use to carry the communication, similarly transitioning the UE to a connected or active mode in which the UE can engage in the communication.

OVERVIEW

In systems that provide service under more than one air interface protocol, service providers may implement functionality that allows UEs to operate by default on one air interface protocol and to dynamically switch over to operate on another air interface protocol when necessary to engage in certain communications. By way of example, in a system that supports both LTE for mobile broadband and a legacy protocol such as CDMA for traditional voice calls, service providers may implement a service called "circuit switched fallback" (CSFB), which allows UEs to operate by default on LTE and to "fallback" to operate on CDMA to engage in voice calls.

Within such a system, each base station in the LTE network that supports CSFB service may periodically broadcast an indicator of the base station's support of CSFB service. For instance, an LTE base station may be configured to periodically broadcast a System Information Block #8 (SIB8) message that includes information about the CDMA network, and the indicator of the base station's support of CSFB service may then take the form of a particular flag (or set of flags) included in this SIB8 message. In particular, if a given LTE base station currently supports CSFB service, the CSFB flag(s) in that base station's SIB8 messages may be "turned on." On the other hand, if a given LTE base station does not currently support CSFB service, the CSFB flag(s) in the base station's SIB messages may be "turned off." The LTE base station may send other indicators of the base station's support of CSFB service as well.

In practice, UEs in an LTE base station's coverage area may then rely on this indicator of the base station's support of CSFB service to determine how those UEs should engage in signaling with the CDMA network to place and receive voice calls. For instance, if a UE receives an indication that the UE's serving LTE base station currently supports CSFB service, a UE may then place and receive voice calls using the CSFB service, which generally enables the UE to engage in voice call signaling with the CDMA network through the LTE network. Alternatively, if the UE receives an indication that the UE's serving LTE base station does not currently support CSFB service, a UE may then place and receive voice calls using some other approach (e.g., single radio LTE (SRLTE)) that requires the UE to tune away or hand over to the CDMA network in order to engage in voice call signaling with the CDMA network, which may result in the UE experiencing lower LTE throughput.

In an example implementation of CSFB service, a "hybrid" LTE/CDMA UE may be arranged by default to scan for and register with an LTE network and to operate with its CDMA radio powered off, but to then engage in control signaling with the CDMA network via the LTE network, i.e., over the LTE air interface. To facilitate this, when the UE registers with the LTE network, LTE network infrastructure such as a mobility management entity (MME) may signal through a communication interface (known as the S102 interface) with an interworking server (IWS), which in turn signals through a communication interface with the CDMA network, to register the UE with the CDMA network as well.

Thereafter, when the CDMA network has a voice call to connect to the UE, the CDMA network may engage in CSFB call setup signaling with the UE via the IWS and the LTE network. For instance, the CDMA network may first signal through the IWS to the LTE network to cause the LTE network to transmit a CSFB page message to the UE over the LTE air interface. Upon receiving the CSFB page message for the incoming CSFB call, the UE may then transmit a CSFB extended service request (ESR) message to its serving LTE base station as a request to setup the incoming CSFB call. In response, the LTE base station may send to the UE a list of CDMA carriers on which the local CDMA network provides service, at which point the UE may use its CDMA radio to scan for coverage on each of the listed CDMA carriers. The UE may then transmit to the LTE base station a measurement report of the CDMA pilot signals detected by the UE, and the LTE network may in turn pass the UE's pilot signal measurements via the IWS to the CDMA network. The CDMA network may use those measurements as a basis to determine a CDMA coverage area and traffic channel to assign to the UE. The CDMA network may then transmit a handover direction message to the UE via the IWS and the LTE network, thereby directing the UE to transition to CDMA to communicate in the assigned CDMA coverage area and traffic channel. Finally, the UE may use its CDMA radio to tune to the assigned channel and to engage in the call via CDMA.

When the UE is served by the LTE network and has a voice call to place, the UE may engage in similar CSFB call setup signaling with the CDMA network via the LTE network and the IWS. For instance, the UE may first transmit over the LTE air interface to its serving LTE base station a CSFB ESR message to request setup of an outgoing CSFB call, and the LTE base station may similarly respond by sending to the UE a list of CDMA carriers on which the local CDMA network provides service. The UE may then similarly tune to CDMA, scan for coverage on each of the listed CDMA carriers, and report the strongest detected CDMA pilots to the LTE base station. And the CDMA network may similarly receive the UE's pilot measurements from the LTE network, determine a CDMA coverage area and traffic channel to assign to the UE, and transmit a handover direction message via the IWS to the LTE network for transmission to the UE. Finally, the UE may similarly use its CDMA radio to tune to the assigned channel and to engage in the call via CDMA.

The CSFB service is generally efficient, as it allows the UE to engage in CDMA voice call setup signaling through its existing LTE connection without the need for the UE to tune away or hand over to the CDMA network. However, from time to time, error conditions may arise that inhibit the system's ability to provide CSFB service. For instance, one possible error condition could take the form an overload of CSFB signaling in the system (e.g., over the S102 interface), which may result in call setup delays and possibly even call setup failures. And another possible error condition could take the form of a failure of an interface or element through which the networks exchange in CSFB signaling (e.g., the S102 interface or the IWS), which may likewise result in call setup delays and failures.

Unfortunately, current systems that provide CSFB service are not configured to intelligently detect or address these types of error conditions. Indeed, when error conditions such as these arise, LTE base stations in the system may continue to advertise that CSFB service is available and UEs may then continue to use the CSFB service for voice call signaling, even though the CSFB service is no longer working properly. As a result, UEs may begin to experience call setup delays, call failures, and/or missed calls.

Disclosed herein are methods and systems to help address these possible issues. In accordance with the disclosure, while a wireless communication system is providing a service such as CSFB that enables UEs being served by a first network (e.g., LTE network) to engage in signaling with a second network (e.g., a CDMA network) via the first network, the system may be configured to monitor for an error condition associated with the service, such as an undesirable level of signaling associated with the service, a failure associated with a communication interface between the first and second networks, etc. And upon detecting such an error, the system may be configured to responsively direct one or more UEs being served by the first network to refrain from using the service that enables signaling with the second network via the first network. For instance, in one implementation, the system may cause base stations in the first network to stop broadcasting an indication that the service is available, which may serve to direct all UEs in the base stations' coverage areas to refrain from using the service. In another implementation, the system may identify a particular subset of the UEs being served by the first network and then cause base stations in the first network to send an instruction to refrain from using the service to the particular subset of UEs. Other implementations are possible as well.

Advantageously, the methods and systems disclosed herein may enable a system to detect an error condition relating to a service such as CSFB that enables UEs in a first network to engage in signaling with a second network through the first network, and to then take remedial measures that may allow UEs to continue receiving service from the second network without significant interruption. Additionally, in some circumstances, these remedial measures could help to resolve the error condition (e.g., if the error condition is an overload of CSFB signaling).

Accordingly, one embodiment of the disclosed methods may take the form of a method that takes place in a communication system including a first radio access network (RAN) configured to serve UEs over a first air interface, a second RAN configured to serve UEs over a second air interface, and a communication interface between the first and second RANs. The method may involve (a) providing a service that enables UEs being served by the first RAN to engage in signaling with the second RAN via the first RAN, (b) detecting an error condition associated with the service that enables UEs being served by the first RAN to engage in signaling with the second RAN via the first RAN, and (c) responsive to detecting the error condition, directing one or more UEs being served by the first RAN to refrain from using the service that enables UEs served by the first RAN to engage in signaling with the second RAN via the first RAN. This method may be particularly applicable to systems that provide CSFB service, but may also apply to other services as well.

In practice, the feature of detecting an error condition associated with the service that enables UEs being served by the first RAN to engage in signaling with the second RAN via the first RAN may take various forms. As one example, this feature may involve detecting that a level of signaling associated with the service exceeds a predefined threshold level. As another example, this feature may involve detecting a failure associated with the communication interface between the first RAN and the second RAN. For instance, in a system that includes an IWS between the first and second RANs, this feature may involve detecting a failure of the interface between the first RAN and the IWS or a failure of the IWS itself. The feature of detecting an error condition associated with the service may take other forms as well.

In line with the discussion above, the feature of directing one or more UEs being served by the first RAN to refrain from using the service may also take various forms. As one example, this feature may involve causing one or more base stations of the first RAN to cease broadcasting an indication that the one or more base stations support the service, which may serve to direct all UEs being served by the one or more base stations to refrain from using the service. As another example, this feature may involve identifying a subset of the UEs being served by the first RAN and then causing the one or more base stations serving the identified subset of UEs to send those UEs an instruction to refrain from using the service. The feature of directing the one or more UEs being served by the first RAN to refrain from using the service may take other forms as well. And the method may further include a feature of later directing the one or more UEs to resume using the service.

Another embodiment of the disclosed methods may take the form of a method that takes place in a communication system that includes a LTE network configured to serve UEs over a first air interface, a legacy network configured to serve UEs over a second air interface, and a communication interface between the LTE network and the legacy network. The method may involve (a) providing a CSFB service that enables UEs being served by the LTE network to engage in signaling with the legacy network via the LTE network, (b) detecting an error condition associated with the CSFB service, and (c) responsive to detecting the error condition, directing a group of one or more UEs being served by the LTE network to refrain from using the CSFB service.

Also disclosed herein are various network entities configured to facilitate implementation of the disclosed methods. One embodiment of these network entities may include (a) a network communication interface configured to provide connectivity with a wireless carrier network, (b) a processing unit, (c) data storage, and (d) program instructions stored in the data storage and executable by the processing unit to carry out features described herein.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a simplified block diagram of a network arrangement in which an exemplary embodiment of the present method can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
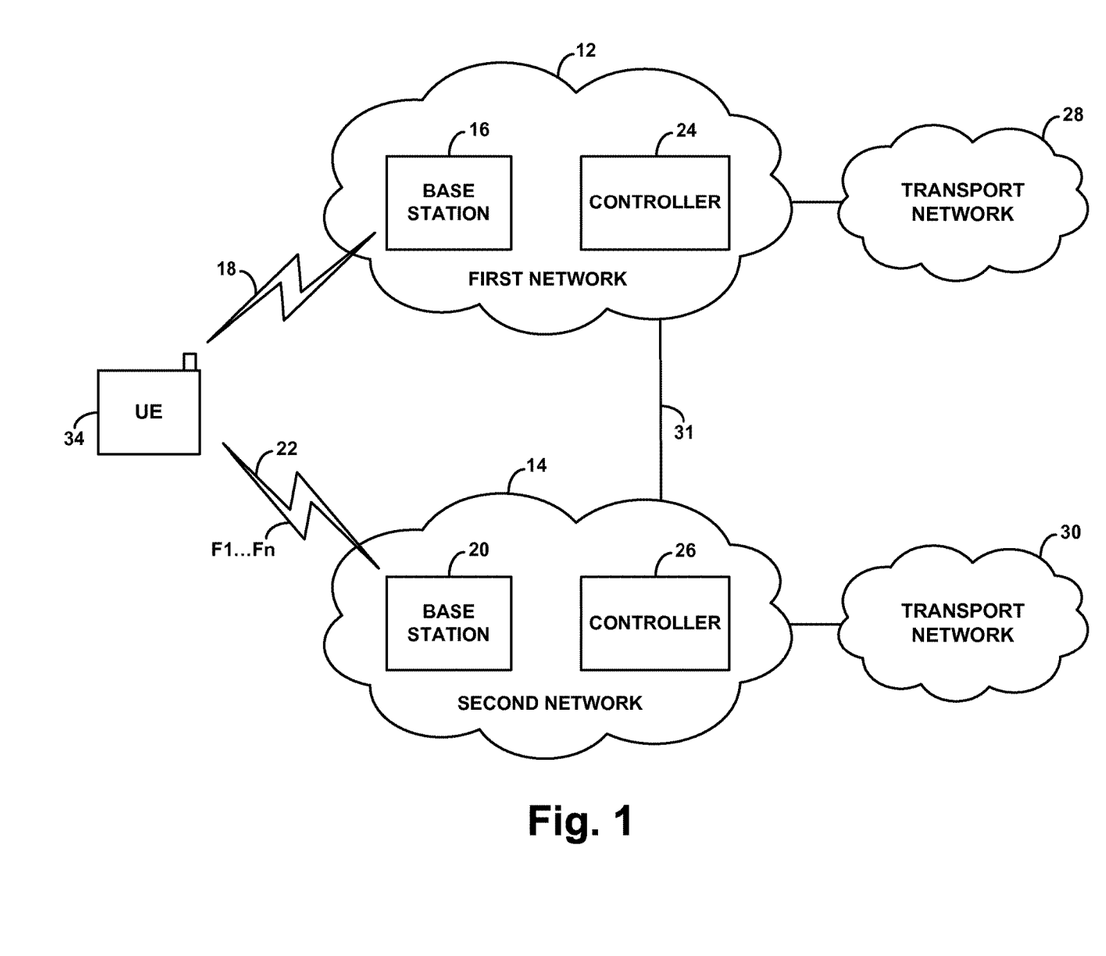
FIG. 1 is a simplified block diagram of a network arrangement in which an exemplary embodiment of the present method and apparatus can be implemented.

The arrangement of FIG. 1 includes by way of example two representative access networks 12, 14, each of which may function to provide UEs with air interface coverage and connectivity with one or more transport networks, such as the PSTN and the Internet. Each of these networks may include one or more base stations that radiate to provide one or more respective coverage areas defining an air interface in which to exchange control and bearer data with UEs. For simplicity in the arrangement shown, for instance, network 12 includes a representative base station 16 that radiates to provide a coverage area 18, and network 14 includes a representative base station 20 that radiates to provide a coverage area 22. As discussed above, each such coverage area may operate on one or more carriers. By way of example, coverage area 22 provided by base station 20 of network 14 is shown operating on a plurality of carriers labeled F1 . . . Fn.

Additionally, each network may operate according to a particular air interface protocol. For example, network 12 may operate according to LTE or WiMax protocols, while network 14 may operate according to CDMA or GSM protocols. These networks could also operate according to other protocols now known or later developed.

Each network may then further include various network infrastructure to support setup of connections and communications and/or to provide connectivity with transport networks. This network infrastructure may take various forms and include any of a variety of network elements, including for instance a controller of one form or another. For instance, in the general arrangement shown in FIG. 1, network 12 includes at least a respective controller 24, and network 14 includes at least a respective controller 26. Network 12 is then shown providing connectivity with a representative transport network 28 (e.g., the Internet), and network 14 is shown providing connectivity with a representative transport network 30 (e.g., the PSTN). However, the specific arrangement of networks 12 and 14 will depend on the air interface protocol employed by those networks.

As shown, networks 12 and 14 may also be interconnected via an interface 31 that generally functions to facilitate interworking between network 12 and network 14. The interface 31 may take various forms. In one example implementation, for instance, the interface 31 may serve to interconnect controllers 24, 26 via a communication path that may include network cables and perhaps also network entities such as an interworking server (IWS) or the like. The interface 31 may take other forms as well.

It should be understood that FIG. 1 depicts networks 12 and 14 as physically separate arrangements to emphasize that they operate according to different wireless protocols and that in practice networks 12 and 14 may be physically co-located in an overlay arrangement. For instance, networks 12 and 14 may share common base stations, each with shared or separate channel cards/units and associated logic for each wireless protocol. Alternatively, networks 12 and 14 may have respective base stations but share one or more common network elements (e.g., a radio network controller (RNC), a mobile switching center (MSC), etc.). Other examples are possible as well, and the specific details of the access network arrangements and their physical relationship with each other are not critical to the embodiments described herein.

Figure 2:
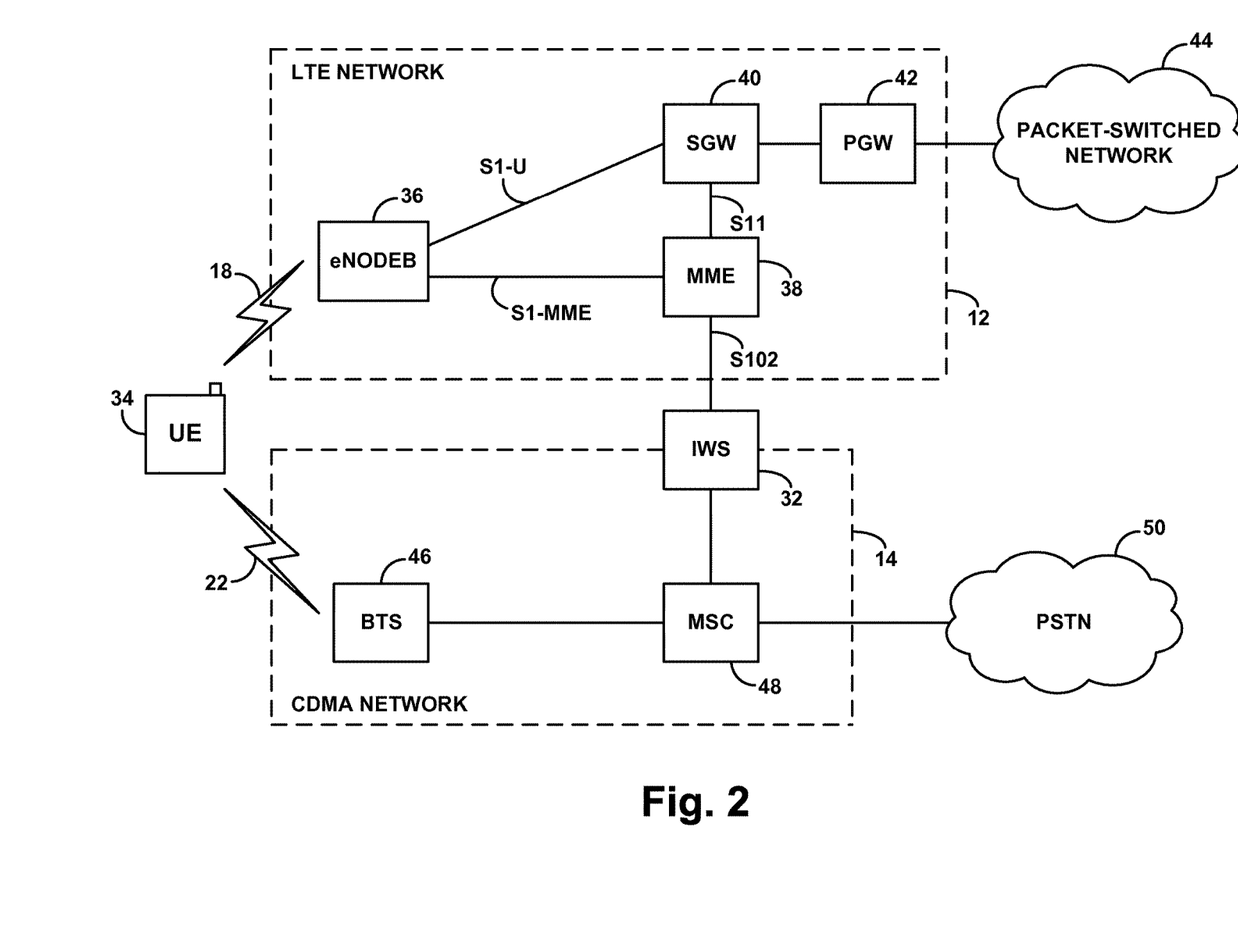
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves UEs with wireless packet data communication service (including perhaps voice-over-packet and other packet-based real-time media service), and network 14 is a legacy network (e.g., a CDMA network) that primarily serves UEs with circuit-switched voice call service (but may also provide packet-data communication service and other types of service). These networks could take other forms and operate according to other protocols as well.

LTE network 12 in this arrangement is shown as including an eNodeB 36 that serves as the LTE network's representative base station 16, which includes an antenna structure and associated equipment for engaging in LTE communication over the air interface of coverage area 18 with UEs. eNodeB 36 is then shown coupled with an MME 38 that serves as controller 24, and in particular, a signaling controller for LTE network 12. Further, eNodeB 36 is also shown coupled with a serving gateway (SGW) 40, which may then be coupled with both MME 38 and a packet-gateway (PGW) 42 that connects with a packet-switched transport network 44. Although the elements of LTE network 12 are shown with direct connections between them, in one common arrangement, the elements may sit as nodes on a core packet network, and thus the illustrated connections may be logical interfaces between the elements over that network.

In turn, CDMA network 14 is shown as including a base transceiver station (BTS) 46 that serves as the CDMA network's representative base station 20, which includes an antenna structure and associated equipment for engaging in CDMA communication over the air interface of coverage area 22 with UEs. BTS 46 is then shown in communication (possibly through a base station controller (BSC) or RNC (not shown)) with a MSC 48 that serves as controller 26, which functions to manage paging over the CDMA air interface (among other tasks) and also provides connectivity with PSTN 50.

As further shown in FIG. 2, the interface 31 of FIG. 1 may include an IWS 32 that is connected between the MME 38 (via the S102 interface) and the MSC 48. (While IWS 32 is shown in FIG. 2 as a separate network element, it should be understood that IWS 32 may alternatively be provided as a function of one of the elements in networks 12, 14, such as a function of MSC 48 for instance). IWS 32 may generally operate to pass signaling between networks 12 and 14. For instance, in the context of the present disclosure, IWS 32 may function to pass signaling messages that are associated with a service, such as CSFB, that enables a UE operating in network 12 to engage in signaling with network 14 through network 12 (or vice versa). IWS 32 may pass other signaling messages between networks 12, 14 as well.

Network 12, network 14, and IWS 32 may be owned and operated by a common wireless service provider, and the service provider may configure the networks to interwork with each other (or may arrange for the IWS to associate the networks with each other) so as to facilitate a service, such as CSFB for instance. Alternatively, the networks may be owned and/or operated by separate wireless service providers, and those service providers may have an agreement with each other to allow for interworking between the networks, again to facilitate a service such as CSFB or the like.

With the arrangement shown in FIGS. 1-2, a UE 34 is shown positioned in coverage of both network 12 and network 14. When a UE such as UE 34 first powers on or arrives in coverage of network 12, UE 34 may scan for and detect coverage provided by network 12 and may responsively register with network 12 by transmitting a registration request in coverage area 18 to base station 16. This process might take various forms.

For example, referring to FIG. 2, UE 34 may detect an overhead signal broadcast by eNodeB 36 in coverage area 18, such as a System Information Block #8 (SIB8), which may include one or more data flags that UE 34 may programmatically interpret to mean that eNodeB 36 supports a CSFB service in coverage area 18. In response to detecting this broadcast signal, UE 34 may then register in coverage area 18 with LTE network 12. Under LTE principles, UE 34 may do so by transmitting to eNodeB 36 an attach request data that indicates capabilities of UE 34, including whether UE 34 supports a service such as CSFB that enables the UE to engage in signaling with network 14 through network 12.

In response to UE 34 registering with network 12, an element of network 12 (e.g., controller 24) may then record the fact that UE 34 is present within coverage area 18, so as to facilitate paging UE 34 for voice calls or other incoming communications. Further, based on the association between network 12 and network 14 and the capabilities of UE 34, network 12 may also responsively signal to IWS 32 to trigger registration of UE 34 with network 14.

For instance, referring again to FIG. 2, the eNodeB 36 may respond to the UE's attach request by signaling MME 38 to register the presence of UE 34 in coverage area 18. And if the UE's attach request indicates that UE 34 supports CSFB functionality, MME 38 may also signal to IWS 32 over the S102 interface to trigger registration of UE 34 with CDMA network 14. For example, upon receipt of the signal from MME 38, IWS 32 may signal to MSC 48, and MSC 48 (in cooperation with a home location register and/or other network infrastructure) may register the fact that UE 34 is currently served by LTE network 12. UE 34 may then idle in coverage area 18 of network 12 until an event occurs that triggers UE 34 to initiate setup of a new communication.

For instance, when network 14 has a call or other communication to connect or otherwise provide to UE 34, network 14 may send a page message (or page message trigger) to IWS 32, which IWS 32 may pass along to MME 38 of network 12 to trigger paging of UE 34 via network 12. Network 12 may then responsively page UE 34 by having base station 16 transmit a CSFB page message to UE 34 in coverage area 18. In line with the example CSFB procedures described above, once UE 34 responds to this CSFB page, UE 34 may then send a CSFB ESR message to base station 16 to request setup of the CSFB communication.

Alternatively, when UE 34 receives a request to initiate a call, UE 34 may establish connectivity with base station 16 and may send a CSFB ESR message to base station 16 to request setup of a voice call with the network 14 through network 12.

In either case, base station 16 may then transmit to UE 34 a list of carriers of the second network 14 for UE 34 to scan in search of coverage in which to engage in the communication. In practice, for instance, base station 16 may be provisioned to provide a list of one or more carriers on which base stations of network 14 (e.g., base station 20) operate, such as carriers F1 . . . Fn for instance. UE 34 may then scan each of those carriers of network 14 in search of coverage and may report one or more strongest detected coverage areas in a measurement report to base station 16 of network 12.

An element of network 12 (e.g., MME 38) may then forward to IWS 32 a representation of the UE's measurement report, which IWS 32 may in turn provide to an element of network 14 (e.g., MSC 48). With that information, network 14 may then select an appropriate coverage area and traffic channel on which to have UE 34 engage in the communication. And network 14 may return to IWS 32 a handover direction message directing UE 34 take transition to that coverage area and channel to engage in the communication. IWS 32 may then pass that handover direction message to network 12 (e.g., over the S102 interface to MME 38), and base station 16 may transmit the message in coverage area 18 to UE 34. UE 34 may then transition to be served by the indicated coverage area and channel of network 14 so as to engage in the communication.

As noted above, while a service such as this may generally provide an efficient way for a UEs operating in network 12 to engage in signaling with network 14 through network 12, error conditions may arise that delay or even entirely block the UE's signaling with network 14, which may in turn result in delayed call setup, call failure, and/or missed calls. Disclosed herein are methods and systems that help to address these issues.

Figure 3:
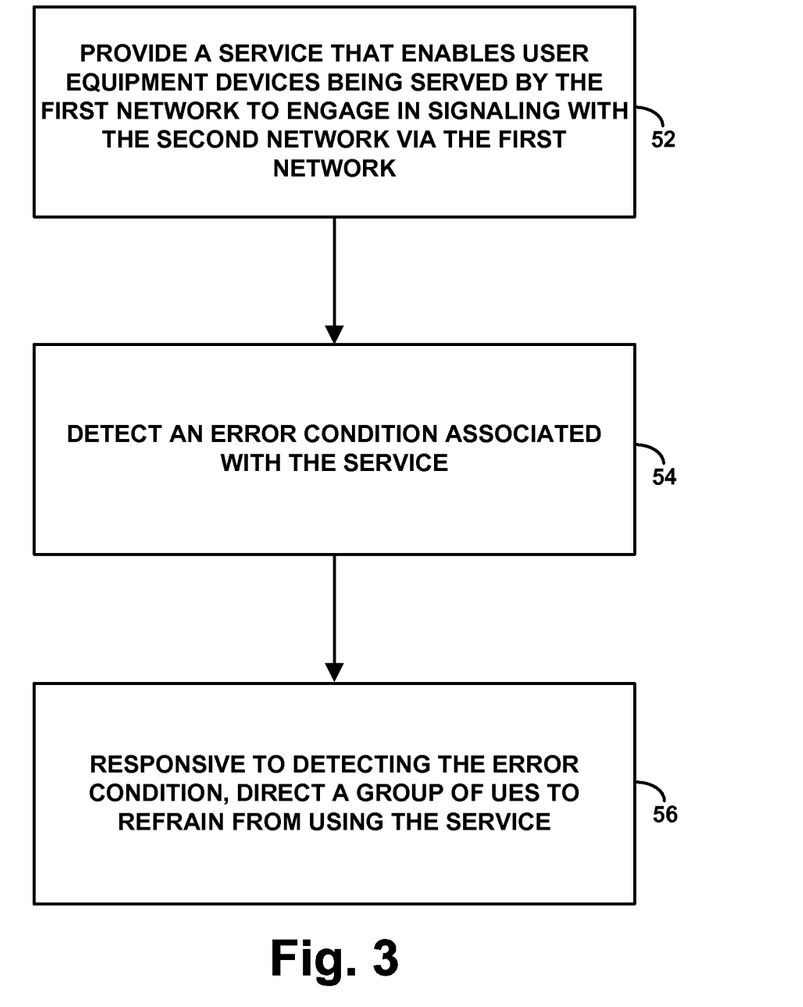
FIG. 3 is a flow chart depicting functions that can be carried out in accordance with an example method.

Turning now to FIG. 3, a flow chart is shown depicting functions that can be carried out in accordance with the present disclosure. For purposes of illustration only, these functions are described with reference to the general arrangement depicted in FIG. 1.

As shown in FIG. 3, at block 52, the method involves providing a given service that enables UEs being served by network 12 (e.g., UE 34) to engage in signaling with network 14 via the first network 12. For instance, the method may involve providing CSFB service to one or more UEs being served by network 12.

In a preferred implementation, while providing the given service, a base stations or other network entity in network 12 may be configured to broadcast an indication to inform UEs that the respective base station or network entity supports the given service. For instance, with reference to FIG. 1, base station 16 of network 12 may broadcast an indication to inform UEs in the base station's coverage area (e.g., UE 34) that base station 16 supports the given service.

The indication that the base station supports the given service may take various forms. As one example, in line with the discussion above, the indication that the base station supports the given service may take the form of a particular flag (or set of flags) included in an overhead message broadcast by the base station, such as an SIB8 message. The indication that the base station supports the given service may take other forms as well.

According to this implementation, UEs being served by base station 16 may then rely on the indication of the base stations' support of the given service to determine whether or not to use the given service. For example, UE 34 may generally be configured to (a) use the given service to exchange signaling with network 14 if the UE receives an indication that base station 16 supports the given service (e.g., a SIB8 message with the CSFB-related flags turned off) and (b) use an alternate means of exchanging signaling with network 14 (e.g., by tuning away or handing over to network 14) if the UE does not receive an indication that base station 16 supports the given service (e.g., a SIB8 message with the CSFB-related flags turned off).

In another implementation, while providing the given service, base station 16 may be configured such that it does not transmit any indications that the base station supports the given service. According to this implementation, UE 34 may then be configured to presume that base station 16 supports the given service and attempt to use the given service unless the UE receives an indication that base station 16 does not support the given service.

The base stations of network 12 and the UEs being served by network 12 may be configured in other manners as well in order to facilitate provision of the given service.

At block 54, while providing the given service, the method may then involve detecting an error condition associated with the given service. This function may take various forms and may be carried out by various entities in network 12 and/or network 14.

In one implementation, the act of detecting the error condition may involve detecting that a level of signaling associated with the given service exceeds a threshold level.

For example, with reference to the general arrangement of FIG. 1, a controller or other network element in network 12 and/or network 14 (e.g., an MME or MSC) may detect that a level of signaling associated with the given service that is passing over interface 31 exceeds a threshold level. As another example, a controller or other network element in network 12 (e.g., an MME) may detect that a level of signaling associated with the given service that is being exchanged with UEs over the air interface of network 12 exceeds a threshold level. Detecting that a level of signaling associated with the given service exceeds a threshold level may take other forms as well.

In practice, to detect that a level of signaling associated with the given service exceeds a threshold level, a network element may first determine the level of signaling using a measure such as a total amount of signaling traffic exchanged over a given timeframe, an amount of a particular type of signaling traffic exchange over a given timeframe (e.g., only signaling traffic received from UEs), or the like. In turn, the network element may compare the determined level of a signaling to a threshold level of signaling, which may be represented according to the same measure used to determine the level of signaling and may generally be set to reflect a point at which a level of signaling associated with the given service becomes undesirable. This threshold level may thus take various forms, examples of which may include a predefined value set by the service provider or a variable value defined based on the arrangement and/or status of the network. Finally, based on the comparison, the network element may detect that the level of signaling exceeds the threshold level.

In another implementation, the act of detecting the error condition may involve detecting a failure associated with a communication interface over which service-related signaling traffic is exchanged. For instance, with reference to the general arrangement of FIG. 1, a controller or other network element in network 12 (e.g., an MME) may detect a failure associated with interface 31 between network 12 and 14, which could take the form of a disconnection in the communication path between networks 12 and 14 (e.g., an unplugged or defective network cable), a failure of a network element that sits in the communication path between networks 12 and 14 (e.g., an IWS), or the like. Detecting a failure associated with a communication interface over which service-related signaling traffic is exchanged may take other forms as well.

In practice, the controller or other network element in network 12 may detect the failure associated with a communication interface over which service-related signaling traffic is exchanged using any technique now known or later developed for monitoring the status of communication interfaces (e.g., a heartbeat mechanism). As one representative example, an MME may detect a failure related to an interface that includes an IWS based on A21 messages exchanged between the MME and the IWS. Many other examples are possible as well.

It should be understood that the implementations above could also be combined, such that an error condition could be detected based on either a threshold-high level of signaling or an interface failure. And the act of detecting an error condition could take other forms as well, including the possibility that the error condition could be something other than a threshold high level of signaling or an interface failure.

At block 56, in response to detecting the error condition, the method then involves directing one or more UEs being served by access network 12 to refrain from using the given service. This function may likewise take various forms.

In one embodiment, the act of directing one or more UEs being served by access network 12 to refrain from using the given service may involve directing all UEs being served by network (or at least all UEs being served by particular base stations of network 12) to refrain from using the given service. For instance, in response to detecting the error condition, the controller or network entity may send a notification of the error condition to one or more base stations in network 12, which may then trigger the one or more base stations to direct UEs being served by the base stations to refrain from using the given service. The one or more base stations may carry out this direction in various manners. In one example, if a base station is configured to broadcast an indication that the base station supports the given service, the base station may carry out this direction by ceasing to broadcast an indication that the base station supports the given service (e.g., by turning off the CSFB-related flags in the SIB8 message). In another example, the base station may carry out this direction by beginning to broadcast a separate indication that the base station does not support the given service. Other examples are possible as well.

In another embodiment, the act of directing a group of one or more UEs being served by access network 12 to refrain from using the given service may involve directing a particular subset of the UEs being served by network 12 (rather than all UEs being served by network 12) to refrain from using the given service. Depending on the implementation of the disclosed method, this particular subset of UEs could be defined based on various criteria. As just a few representative examples, such criteria may include the location of the UEs (e.g., UEs at the cell edge), a service class and/or priority level assigned to the UEs (e.g., UEs associated with a pre-paid account), a usage measure associated with the UEs (e.g., UEs that generate a greater extent of signaling traffic associated with the given service), and/or UE capabilities (e.g., whether or not the UE is capable of using SRLTE when CSFB is not available). However, it should be understood that various other criteria could be used as well.

The act of directing the particular subset of the UEs to refrain from using the given service may also take various forms. For instance, in one implementation, a controller or other network entity in network 12 may be configured to dynamically identify the particular subset of UEs (based on the criteria above for example) when the error condition is detected. And once the particular subset of UEs is identified, the controller or network entity may then be configured to trigger the one or more base stations that are serving the UEs in this particular subset to transmit signals over the air interface that serve to direct such UEs to refrain from using the given service. These signals may take various forms. As one possible example, the signal may take the form of an additional flag in a UE-specific message, such as an RRC Connection Reconfiguration message in LTE, which may be sent to each UE in the particular subset of UEs. Other examples are possible as well.

In another implementation, the network and the UEs could be preconfigured with knowledge of which UEs are considered to be part of the particular subset of UEs, which may avoid the need for the controller or other network entity to dynamically identify the particular subset of UEs. Rather, when the error condition is detected, the controller or other network entity may be configured to trigger the base stations in network 12 to each broadcast a signal over the air interface that is interpreted by UEs in the particular subset as a direction to refrain from using the given service and is ignored by other UEs. These signals may take various forms. As one possible example, the signal may take the form of an additional flag in a broadcast message, such as a SIB message in LTE, which may be periodically broadcast by the base stations of network 12. Other examples are possible as well.

After directing one or more UEs being served by access network 12 to refrain from using the given service, these UEs may then refrain from using the given service and instead use another approach to engage in signaling with network 14, such as by tuning away or handing over to network 14. Correspondingly, network 14 may begin to engage in signaling with these UEs via the air interface of network 14, rather than the air interface of network 12.

Accordingly, this direction for the one or more UEs to refrain from using the given service may enable the one or more UEs to continue receiving service from network 14 without the type of interruption that may have otherwise been caused by the error condition. Moreover, to the extent that the error condition is associated with an undesirable level of signaling associated with the given service, the direction for the one or more UEs to refrain from using the given service may likewise help to resolve this error condition.

Figure 4:
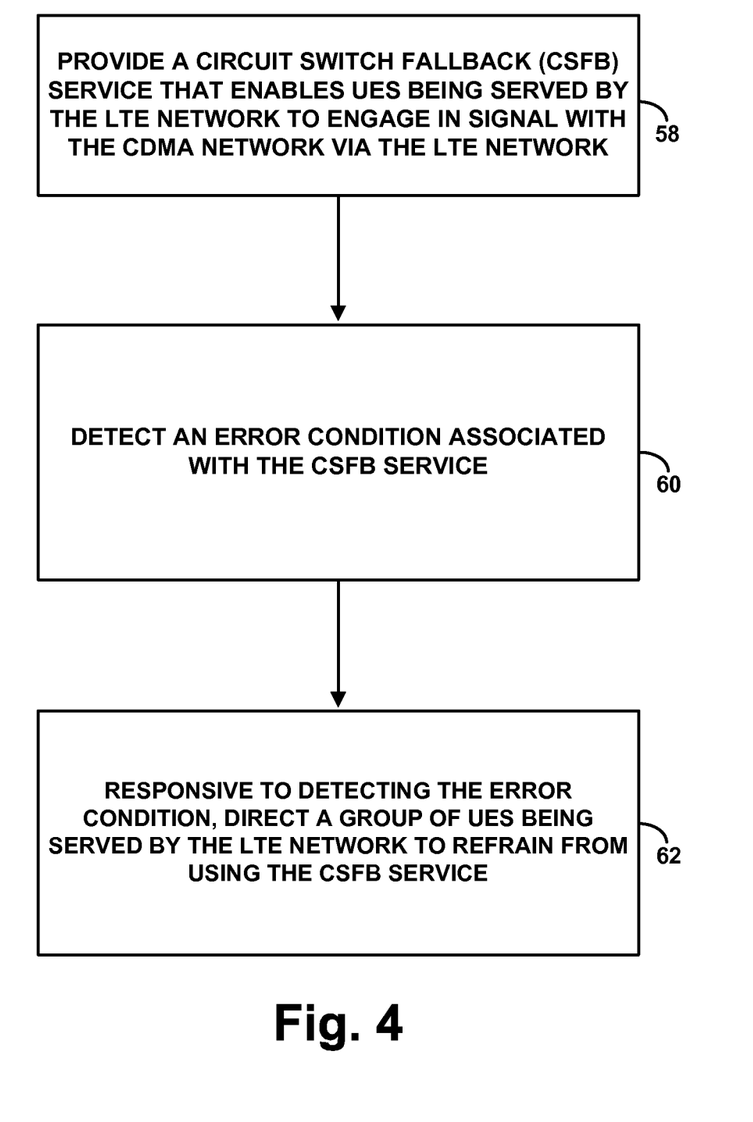
FIG. 4 is another flow chart depicting functions that can be carried out in accordance with an example method.

FIG. 4 is now another flow chart depicting an example implementation of the functions of FIG. 3 that is described with reference to the more specific network architecture of FIG. 2.

At block 58, the method involves providing a CSFB service that enables UEs being served by the LTE network 12 (e.g., UE 34) to engage in signaling with the CDMA network 14 via the LTE network 12. For instance, eNodeB 36 in LTE network 12 may be configured to periodically broadcast a SIB8 message that includes information about the CDMA network 14, and the indication that the eNodeB supports CSFB service may then take the form of a particular flag (or set of flags) included in this SIB8 message.

At block 60, while providing the CSFB service, the method may then involve detecting an error condition associated with the CSFB service. For instance, MME 38 in LTE network 12 may detect an undesirable level of CSFB signaling over the S102 interface, a failure associated of the S102 interface, a failure of the IWS, etc.

At block 62, in response to detecting the error condition, the method then involves directing one or more UEs being served by the LTE network 12 to refrain from using the CSFB service. For instance, in one implementation, eNodeB 36 may be triggered by MME 38 to direct all UEs in being served by the eNodeB to refrain from using the CSFB service, such as by turning off the CSFB-related flags in the SIB message or by beginning send an indication that the eNodeB no longer supports CSFB service. In another implementation, eNodeB 36 may be triggered by MME 38 to direct a particular subset of UEs being served by the eNodeB to refrain from using the CSFB service, such as by sending a signal over the air interface that is for receipt specifically by the UEs in the particular subset.

After directing the directing one or more UEs being served by access network 12 to refrain from using the CSFB service, these UEs may then refrain from using the CSFB service and instead use another approach to engage in signaling with network 14, such as SRLTE. Correspondingly, the CDMA network 14 may begin to engage in voice call signaling with these UEs via the CDMA air interface, rather than the LTE air interface.

Figure 5:
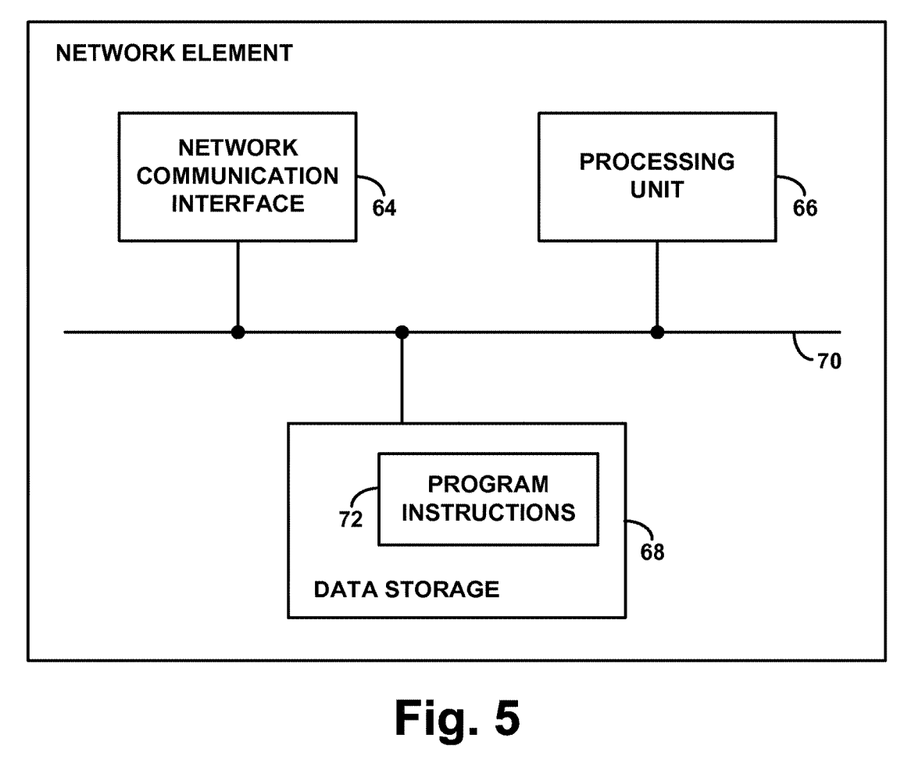
FIG. 5 is a simplified block diagram of a network entity operable in a network arrangement such as that depicted in FIGS. 1 and 2.

FIG. 5 is next a simplified block diagram of an example network element of network 12, showing some of the functional components that may be included in such an entity to facilitate implementation of the disclosed methods. In a preferred implementation, the example network element may be a controller of network 12 (e.g., an MME), but the example network element may take other forms as well, including the possibility that the example network element may be implemented as two or more physically-separate components that are interconnected. As shown in FIG. 5, the example network element includes a network communication interface 64, a processing unit 66, and non-transitory data storage 68, all of which may be communicatively linked together by a system bus, network, or other connection mechanism 70.

Network communication interface 64 may function to provide for communication with various other network elements shown in FIGS. 1-2, including elements in network 12 (e.g., base stations) and elements in network 14 via interface 34 (which may include an IWS or the like). As such, network communication interface 64 may include one or more network interface modules, such as Ethernet network interface modules for instance, or may take any of a variety of other forms that support wireless and/or wired communication with these and other network elements.

Processing unit 66 may then comprise one or more general-purpose processors (e.g., microprocessors) and/or one or more special-purpose processors (e.g., application specific integrated circuits) that may be integrated in whole or in part with network communication interface 64. And data storage 68 may comprise one or more volatile and/or non-volatile storage components, such as optical, magnetic, or flash memory, which may be integrated in whole or in part with processing unit 66.

As shown, by way of example, data storage 68 may then hold program instructions 72 that are executable by processing unit 66 to carry out various functions described herein. For instance, by being configured with a processing unit and these program instructions, the example network element may be configured to (a) facilitate the provision of a given service that enables UEs being served by network 12 to engage in signaling with network 14 (e.g., by exchanging signaling related to the service), (b) detect an error condition associated with the given service, and then (c) direct one or more UEs being served by network 12 to refrain from using the given service (e.g., by causing the base stations of network 12 to send the one or more UEs a direction to refrain from using the given service).

Figure 6:
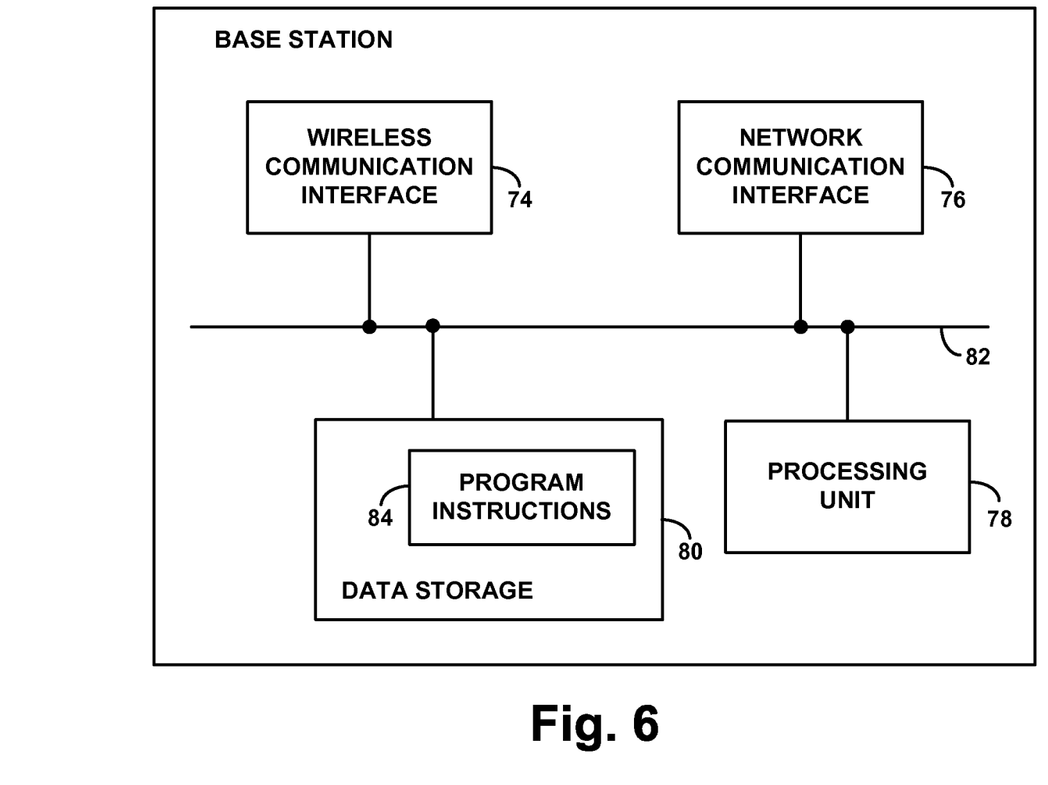
FIG. 6 is a simplified block diagram of a base station operable in a network arrangement such as that depicted in FIGS. 1 and 2.

Finally, FIG. 6 is a simplified block diagram of an example base station of network 12 (e.g., an eNodeB), showing some of the functional components that may be included in such an entity to facilitate implementation of the disclosed methods. As shown in FIG. 6, the example base station includes a wireless communication interface 74, a network communication interface 76, a processing unit 78, and data storage 80, all linked together via a system bus, network, or other connection mechanism 82.

In this arrangement, wireless communication interface 74 may be configured to engage in air interface communication with served UEs. As such, wireless communication interface 74 may comprise an antenna structure (not shown), which may be tower mounted, and associated components such as a power amplifier and a wireless transceiver, so as to facilitate transmission and reception of bearer and control traffic over the air interface.

Network communication interface 76 may then be configured to provide for communication with various other network elements in network 12, such as a controller (e.g., an MME) or a transport-network gateway (e.g., an SGW). As such, network communication interface 76 may include one or more network interface modules, such as Ethernet network interface modules for instance, or may take any of a variety of other forms that support wireless and/or wired communication with these and other network elements.

Processing unit 78 may then comprise one or more general-purpose processors (e.g., microprocessors) and/or one or more special-purpose processors (e.g., application specific integrated circuits), which may be integrated in whole or in part with the communication interfaces. And data storage 80 may comprise one or more volatile and/or non-volatile storage components, such as optical, magnetic, or flash memory, which may be integrated in whole or in part with processing unit 78.

As shown, by way of example, data storage 80 may then hold program instructions 84 that are executable by processing unit 78 to carry out various functions described herein. For instance, by being configured with a processing unit and these program instructions, the example base station may be configured to (a) facilitate provision of a given service that enables UEs being served by network 12 to engage in signaling with network 14 (e.g., by broadcasting an indication of the base station's support of the given service and exchanging signaling related to the service with UEs and other elements of network 12), (b) receive a notification that an error condition associated with the given service has been detected, and (c) in response to the notification, direct one or more UEs to refrain from using the given service.

Exemplary embodiments have been described above. Those skilled in the art will understand, however, that changes and modifications may be made to these embodiments without departing from the true scope and spirit of the invention.

We claim:

1. In a communication system comprising a Long Term Evolution (LTE) network configured to serve user equipment devices (UEs) over a first air interface, a legacy network configured to serve UEs over a second air interface, and a communication interface between the LTE network and the legacy network, a method comprising:
    providing a circuit-switched fallback (CSFB) service that enables UEs being served by the LTE network to engage in signaling with the legacy network via the LTE network;
    detecting on the first air interface a threshold high level of signaling associated with the CSFB service; and
    responsive to detecting on the first air interface the threshold high level of signaling associated with the CSFB service, directing one or more UEs being served by the LTE network to refrain from using the CSFB service, wherein each of the one or more UEs is selected based on whether the UE is capable of using single-radio-LTE (SRLTE) when CSFB is not available.

2. The method of claim 1, after directing the one or more UEs being served by the LTE network to refrain from using the CSFB service, the legacy network engaging in signaling with the one or more UEs via the second air interface.

3. The method of claim 1, wherein directing the one or more UEs being served by the LTE network to refrain from using the CSFB service comprises:
    transitioning from broadcasting an indication indicating that the LTE network supports the CSFB service to no longer broadcasting the indication indicating that the LTE network supports the CSFB service.

4. The method of claim 1, wherein the legacy network is selected from a group consisting of a Code Division Multiple Access (CDMA) network and a Global System for Mobile Communications (GSM) network.

5. The method of claim 1, wherein detecting on the first air interface the threshold high level of signaling associated with the CSFB service comprises: detecting, by a mobility management entity (MME), on the first air interface the threshold high level of signaling associated with the CSFB service.

* * * * *